US006282434B1

United States Patent
Johannisson et al.

(10) Patent No.: US 6,282,434 B1
(45) Date of Patent: Aug. 28, 2001

(54) UPLINK AND DOWNLINK TRANSMISSION QUALITY IMPROVEMENT BY DIFFERENTIATED BASE STATION ANTENNA PATTERN DOWNTILT

(75) Inventors: Bjorn Johannisson, Kungsbacka; Sara Mazur, Bromma, both of (SE)

(73) Assignee: Telefonaktiebolaget LM Ericsson, Stockholm (DE)

( * ) Notice: Subject to any disclaimer, the term of this patent is extended or adjusted under 35 U.S.C. 154(b) by 0 days.

(21) Appl. No.: 09/095,137

(22) Filed: Jun. 10, 1998

(51) Int. Cl.$^7$ .................................................. H04B 1/38
(52) U.S. Cl. ............................................. 455/562; 343/758
(58) Field of Search ..................................... 455/562, 423, 455/67.3, 447; 342/367, 372; 343/758

(56) References Cited

U.S. PATENT DOCUMENTS 4,249,181 * 2/1981 Lee ........................................ 342/367
4,881,082 * 11/1989 Graziano ............................... 342/432
5,434,575 * 7/1995 Jelinek et al. ........................ 342/367
5,551,060 * 8/1996 Fujii et al. ............................ 455/447
5,805,996 * 9/1998 Salmela ................................ 455/453
5,818,385 * 10/1998 Bartholomew ....................... 342/372
5,903,826 * 5/1999 Nowak .............................. 455/277.1
5,969,689 * 10/1999 Martek et al. ....................... 343/758
5,973,641 * 10/1999 Smith et al. ......................... 342/372
6,104,936 * 8/2000 Kronestedt ........................... 455/562

FOREIGN PATENT DOCUMENTS

96/37970 * 11/1996 (FI) ................................. H04B/1/76

* cited by examiner

Primary Examiner—William Trost
Assistant Examiner—Rafael Perez-Gutierrez
(74) Attorney, Agent, or Firm—Burns, Doane, Swecker & Mathis, L.L.P.

(57) ABSTRACT

In a cellular telecommunications network, a method and apparatus is disclosed for providing a substantial gain in downlink C/I by means of antenna pattern downtilt while still maintaining the coverage limiting signal strength in the uplink by the use of different antenna pattern downtilt for the transmit and receive antenna patterns.

40 Claims, 6 Drawing Sheets

α - Uplink Antenna Tilt Angle (in degrees from the vertical plane)

β - Downlink Antenna Tilt Angle (in degrees from the vertical plane)

Downlink C/I (dB) at 10% CDF level as a function of antenna tilt angle (degrees) for a HPBW=8.8 degree antenna placed at heights 10 m (*), 30 m (+), 60 m (O) and 90 m (x) at a site to site distance of 3000 m.

α - Uplink Antenna Tilt Angle (in degrees from the vertical plane)

β - Downlink Antenna Tilt Angle (in degrees from the vertical plane)

UPLINK AND DOWNLINK TRANSMISSION QUALITY IMPROVEMENT BY DIFFERENTIATED BASE STATION ANTENNA PATTERN DOWNTILT

BACKGROUND

The present invention is related to the field of cellular telecommunications. More particularly, the present invention involves a method and apparatus for improving the downlink Carrier-to-Interference ratio (C/I) by means of antenna pattern downtilt while maintaining uplink signal strength.

In a cellular telecommunications system (e.g., a cellular mobile telecommunications system) maintaining and/or improving speech quality is of great importance. One factor which can significantly and adversely affect speech quality is the presence of co-channel interference. Co-channel interference occurs when two or more cells (i.e., co-channel cells) located adjacent to one another or in relatively close proximity to one another reuse (i.e., share) the same frequency or set of frequencies. In essence, a signal being transmitted over a reused frequency in one cell is perceived as interference in the other cell.

One way in which co-channel interference can be avoided is to assign a group of dedicated frequencies to each cell in the system so that no two cells reuse the same frequency. Unfortunately, there are but a limited number of frequencies available to cover an ever increasing demand for cellular service. Accordingly, assigning a dedicated group of frequencies to each cell is generally not a feasible solution to the co-channel interference problem.

Another technique which is often used to minimize, rather than eliminate, co-channel interference involves maximizing reuse distance. Reuse distance is generally understood to be the distance between two cells (i.e., co-channel cells) that reuse the same frequency or set of frequencies. As one skilled in the art will readily understand, as reuse distance increases, co-channel interference decreases (i.e., signal strength diminishes with distance). However, a higher reuse distance inherently implies a less efficient utilization of the available frequency spectrum. Despite increased demand for cellular service, the available frequency spectrum has remained constant. In response, cellular service providers are forced to increase the capacity in their systems and use the available frequency spectrum in the most efficient manner. This in turn tends to decrease rather than increase reuse distance. Consequently, techniques that rely on increasing reuse distance to counter the effect of co-channel interference are not an overly practial or attractive solution in terms of efficient spectrum usage.

Yet another method for reducing co-channel interference involves adjusting the orientation or tilt angle of the base station antenna. In general, the base station antenna transmits and receives telecommunications signals to and from the various mobile units operating within the corresponding cell, herein referred to as the target cell. By redirecting the antenna so that the antenna beam points further and further below the horizon, the energy associated with the antenna beam is, to a greater extent, directed into the target cell and away from any adjacent cells or co-channel cells in close proximity to the target cell. The objective of directing the main beam of the vertical antenna pattern towards a point below the horizon is to reduce the antenna gain towards interfering cells without causing a large reduction of the signal strength in the target cell.

Consequently, uplink interference received by the base station antenna in the target cell is reduced, since the antenna gain to interfering mobile stations in co-channel cells is reduced. Also, downlink co-channel interference received by the mobile units operating in co-channel cells caused by transmissions emanating from the base station antenna in the target cell is reduced due to a lower antenna gain. Tilting all antenna patterns to a point below the horizon to reduce co-channel interference, therefore, leads to a gain in the Carrier-to-Interference ratio (C/I) in both uplink and downlink in the system. This gain can be utilized to improve the quality of the communication or to allow a tighter reuse pattern.

Tilting of the vertical antenna beam can be achieved either mechanically or electrically. A particular mounting arrangement can be used to achieve the desired tilt by mechanical means. In a linear array antenna, the radiating elements have a phase excitation resulting in an electrically tilted main beam.

As with the other above-identified techniques for avoiding or minimizing co-channel interference, redirecting the base station antenna to reduce co-channel interference is not without trade-offs. The increase in C/I in the interfered cell may result in an undesired reduction of coverage at the border of the interfering cell. This is best illustrated with reference to FIG. 1. By increasing the tilt angle 101 of FIG. 1, the peak of the antenna beam 103 is directed inward; away from the target cell's boundary 105. The signal strength or Carrier-to-Interference ratio (C/I) will undesirably decrease for those signals being transmitted between the base station and mobile units operating in the target cell at or near the target cell boundary 105. Stated differently, an increase in the tilt angle 101 of the antenna beam 103 effectively reduces the coverage area of the target cell despite the fact that it reduces the level of uplink co-channel interference in the target cell and downlink co-channel interference in nearby co-channel cells.

The maximal coverage reduction thus limits the C/I gains obtainable by antenna tilting. One approach to this tradeoff is addressed in a co-pending U.S. patent application Ser. No. 08/941,204 entitled "Method and Apparatus for Optimizing Antenna Tilt" where a method for applying antenna downtilt is proposed. The optimum downtilt angle for each base station is derived from system measurements of the uplink interference in the target base station and downlink coverage measurements in the mobile station.

In order to increase capacity or improve quality in present systems, a significant reduction in downlink interference is required. To get a sufficient gain in C/I without degrading coverage too much, tall antennas with narrow vertical beams will have to be employed. Also, the ratio of antenna mounting height with respect to surrounding objects, compared to the site to site distance will have to be kept at a higher level. In many systems, capacity is limited by downlink C/I. Therefore, there exists a need for a system that provides a substantial gain in downlink C/I while maintaining the coverage limiting signal strength in the uplink and without the requirement of having very tall antennas.

SUMMARY

It is an object of the present invention to overcome the deficiencies described above by providing a method and apparatus utilizing differentiated antenna pattern downtilt. This can be achieved by applying different downtilts for transmitting and receiving antenna patterns in a base station.

With this approach, the transmitted antenna pattern may be tilted to provide optimal downlink C/I gain, which allows for a tighter frequency reuse pattern and higher capacity in the system. This may result in a reduction in downlink signal strength at the cell border, which can be compensated by increased transmission power.

By applying a lower tilt angle to the received antenna pattern than to the transmitting antenna pattern, the coverage limiting uplink signal strength can be maintained. If this results in a higher level of uplink interference at a tighter frequency reuse, this interference can be managed by means of techniques such as base station antenna receiver diversity and interference rejection combining (IRC).

BRIEF DESCRIPTION OF THE DRAWINGS

The objects and advantages of the invention will be understood by reading the following detailed description in conjunction with the drawings in which.

DETAILED DESCRIPTION

Figure 1:
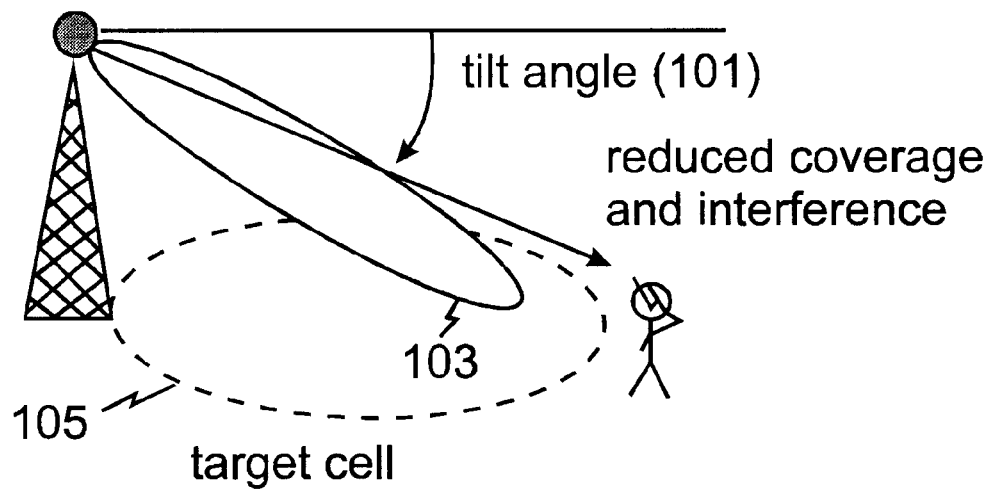
FIG. 1 illustrates the relationship between antenna tilt angle and target cell coverage area in accordance with the prior art.
Figure 2:
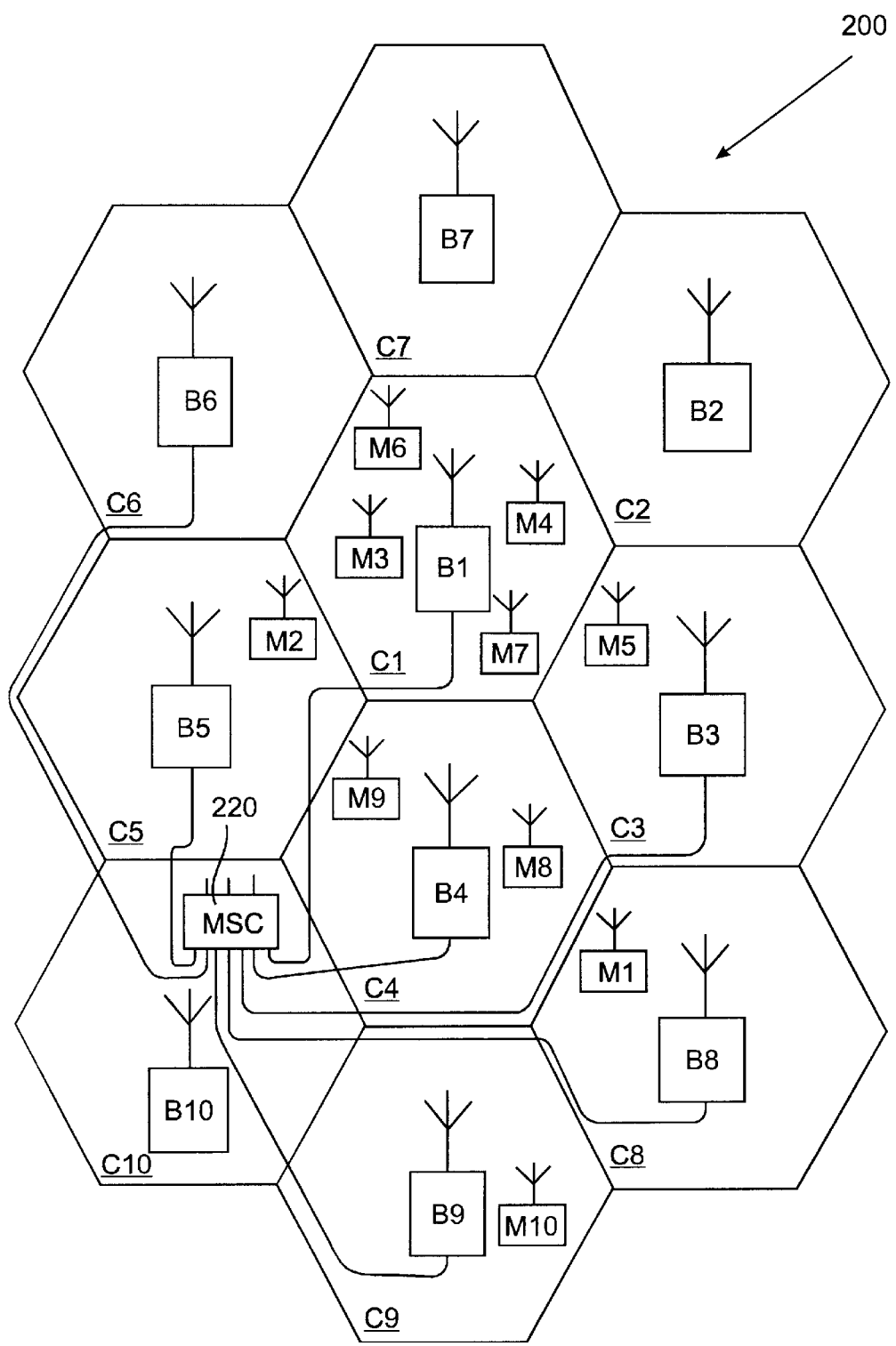
FIG. 2 illustrates a cellular telecommunications network in accordance with the prior art.

FIG. 2 illustrates an exemplary cellular telecommunications network 200 comprising the cells C1–C10. FIG. 2 also illustrates that each cell C1–C10 contains at least one base station, for example, base stations B1–B10. Generally, the base stations communicate directly with the various mobile units M1–M10. In the Advanced Mobile Phone System (AMPS), a mobile switching center (MSC) 220 is usually connected to several base stations, as illustrated. The MSC provides a number of functions including, but not necessarily limited to, frequency allocation and transmitter power level control. In the Global System for Mobile Communication (GSM) system employed in Europe, these functions are accomplished by a base station controller (BSC) rather than a MSC, as is well known in the art.

In a typical frequency allocation plan, two or more cells in the cellular network 200 reuse (i.e., share) the same frequency or set of frequencies. As explained above, reusing frequencies often gives rise to co-channel interference. Unlike prior designs, the present invention addresses the problem of co-channel interference by establishing an optimal tilt angle for each base station antenna pattern, i.e., transmit downlink and receive uplink, as a function of interference reduction.

A tilt angle for the transmit pattern can be determined by measuring: (i) the downlink interference in neighboring co-channels cells by mobile receivers, e.g., using mobile assisted channel allocation (MACA) or mobile assisted handoff (MAHO) measurements and (ii) the downlink coverage in the target cell (i.e., a mobile station's own received signal strength).

It will be understood that in a typical cellular system, such as AMPS or GSM, the mobile units are already configured to measure and then forward downlink interference measurement reports to the base station. A tilt angle for the receive pattern can be evaluated by measuring: (i) the uplink signal strength on channels used by the mobile stations in the target cell; and (ii) the uplink interference experienced by base stations in co-channel cells.

Figure 3:
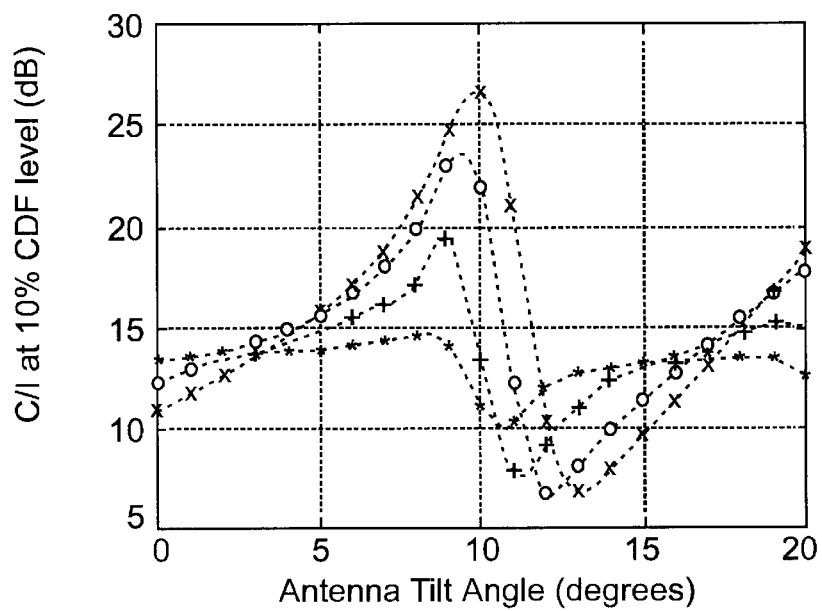
FIG. 3 illustrates downlink C/I as a function of antenna tilt angle for various antenna installation heights.

One way in which the appropriate tilt angles can be determined for transmit and receive patterns using these measurements is empirically. Various tilt angles can be tested, e.g., using simulations. For example, FIG. 3 graphically depicts the results of a simulation which determined downlink interference for various tilt angles and antenna heights. This type of simulation in conjunction with one for downlink cell coverage, provides empirical results from which a system designer or operator can select an optimal tilt angle for the transmit pattern. Similar techniques can be used to determine a tilt angle for the receive pattern.

Figure 4:
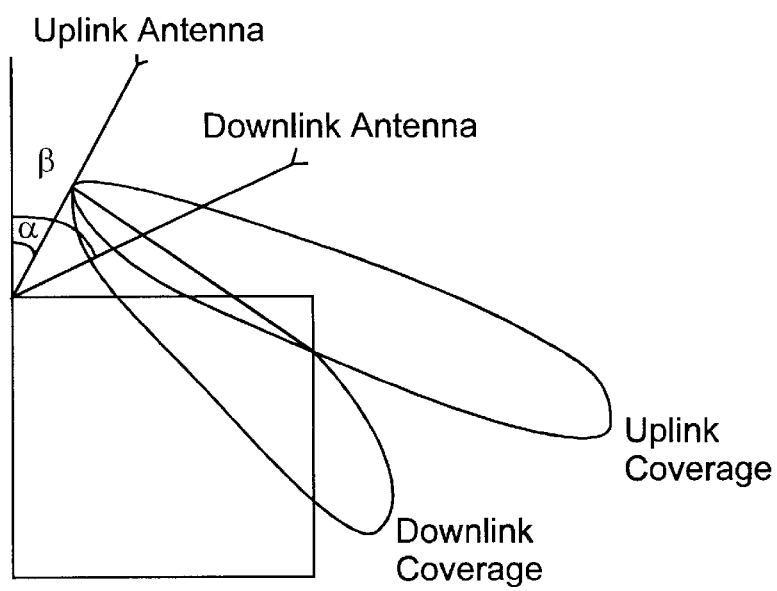
FIG. 4 illustrates a base station with separate uplink and downlink antennas.

Perhaps the most conceptually easy way to provide individual tilt to both the transmit and receive patterns is to supply a separate antenna for the uplink and downlink. With this arrangement, it is possible to apply one tilt angle for the transmitting antenna and another for the receiving antenna. These angles are independent of each other as illustrated in FIG. 4. The uplink antenna has a first tilt angle $\alpha$ which may, for example, be close to zero degrees (0°) from the vertical plane to the antenna axis. The downlink antenna, on the other hand, is given a second downtilt angle $\beta$, which is typically greater than the first angle $\alpha$ as measured, also from the vertical plane to the antenna axis. The tilt may be applied either as a mechanical tilt (e.g., using a servomotor to physically move the antenna) or as an electrical beam tilt (as described below). The two antennas can be arranged in one common mechanical structure or as two mechanically separate antennas.

Figure 5:
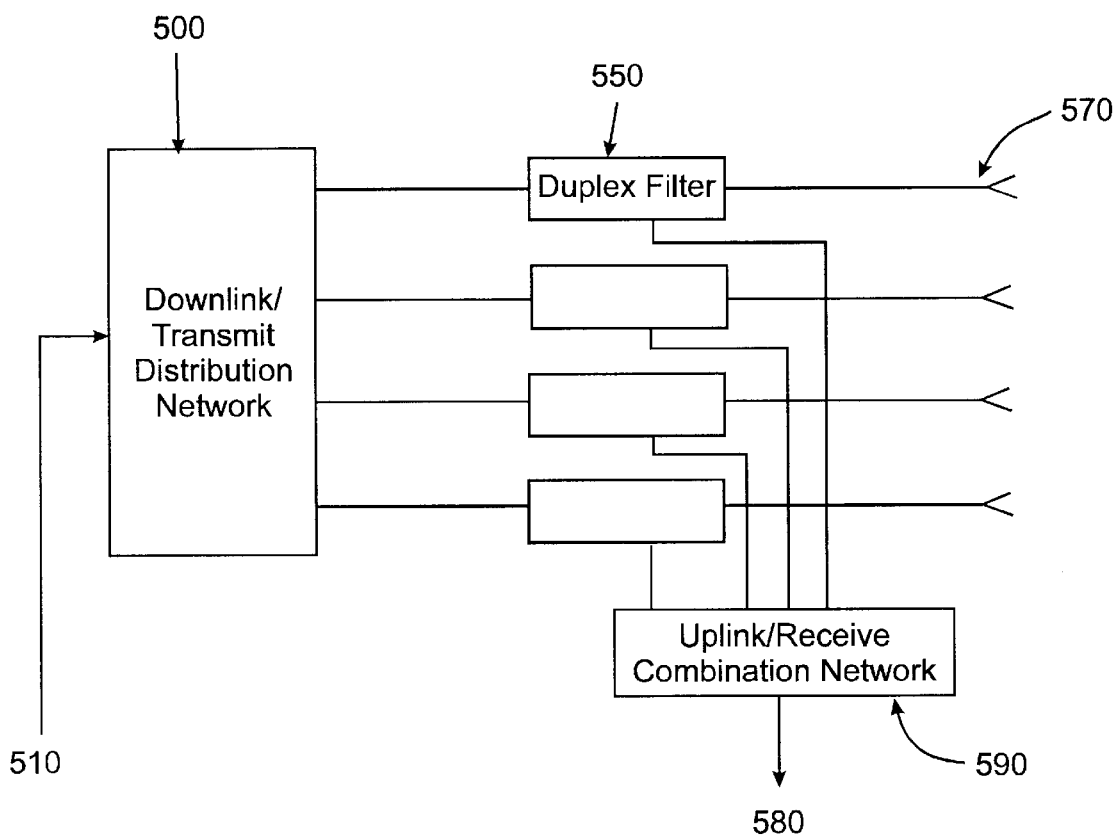
FIG. 5 illustrates a duplex antenna arrangement with separate uplink and downlink networks.

As one example of electrically providing different tilt angles to the transmit and receive patterns, consider the example of FIG. 5. Therein, a duplex filter 550 is connected to each radiating element 570 in a linear array. The filter 550 separates the signals in a transmit distribution network 500 and a receive combination network 590.

Since the two networks are independent, they can be designed for different downtilt angles. Thus, an antenna has a pair of fixed main beams. One of these beams is used for transmitting a signal while the other beam is used for receiving a signal. The antenna of FIG. 5 has two signal ports 510 and 580. One of these ports 510 is for transmission while the other port 580 is for reception. The ports 510 and 580 may be combined into a common port by using an additional duplex filter. The concept of using separate transmit and receive networks can also be used with more than one radiating element connected to each duplex filter.

Figure 6:
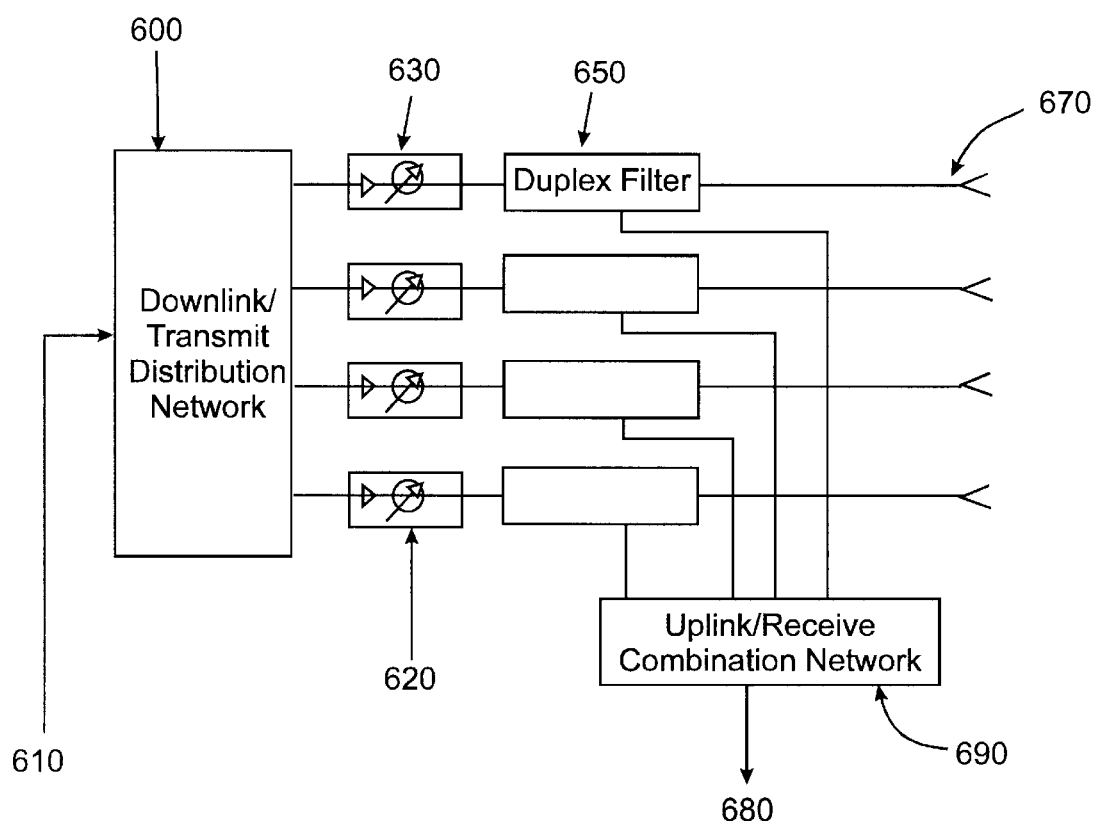
FIG. 6 illustrates an antenna arrangement with distributed downlink phase shifters.

Another way to provide electrically adaptive tilts independently for a receive and a transmit antenna is by using phase shifting elements. By using distributed phase shifters in the feed networks, adjustable electrical downtilt angles of the antenna main beam can be achieved. Active antennas have distributed downlink amplifier modules connected to individual antenna elements through a duplex filter, while the received uplink signal goes through a separate passive combination network. The amplifier modules may be equipped with an electrically controlled phase shifter, making downtilt control possible through a digital interface. FIG. 6 illustrates a block diagram of an antenna with distributed downlink amplifier modules 630 including a phase shifter. In receive mode, a passive combination network will give a fixed downtilt angle.

The antenna may also be designed with a low noise amplifier in the uplink. One such implementation is with one amplifier connected to the combined signal port of the uplink combination network 690. Another alternative is with several distributed low noise amplifiers connected to the duplex filters before the combination network.

In all instances where duplex filters and amplifiers are included in the antenna, the number of radiating elements connected to each duplex filter may vary, both within a design and between different antenna designs.

This invention makes it possible to achieve a substantial gain downlink C/I by antenna pattern downtilt without causing a reduction in the coverage limiting uplink signal strength, for a given antenna size, mounting height and site to site distance.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for increasing a gain in a downlink carrier-to-interference ratio in a cellular telecommunications network, with at least one base station antenna for transmitting a downlink signal and receiving an uplink signal, comprising:

a first measuring means for measuring a downlink parameter associated with at least one of a downlink interference and a downlink coverage in a target cell, wherein said transmitted downlink signal is received by a mobile unit;

a first determining means for determining a first tilt angle for a transmit pattern based upon said at least one downlink parameter;

a second measuring means for measuring an uplink parameter associated with at least one of an uplink signal strength and an uplink interference, wherein said received uplink signal is transmitted by said mobile unit and received by said base station; and a second determining means for determining a second tilt angle for a receive pattern based upon said at least one uplink parameter.

2. The apparatus of claim 1 wherein said downlink pattern parameters are measured by at least one mobile receiver.

3. The apparatus of claim 2 wherein said parameters are forwarded to said base station.

4. The apparatus of claim 1 wherein said uplink pattern parameters are measured by said base station.

5. The apparatus of claim 1 wherein said tilt angles are determined by said base station.

6. In a cellular telecommunications network with at least one base station antenna for transmitting a downlink signal and receiving an uplink signal, a method for increasing a gain in a downlink carrier-to-interference ratio comprising the steps of:

measuring a downlink parameter associated with at least one of a downlink interference and a downlink coverage in a target cell, wherein said transmitted downlink signal is received by at least one mobile unit;

determining a first tilt angle for a transmit pattern based upon said at least one downlink parameter;

measuring an uplink parameter associated with at least one of an uplink signal strength and an uplink interference, wherein said received uplink signal is transmitted by said at least one mobile unit; and determining a second tilt angle for a receive pattern based upon said at least one uplink parameter.

7. The method of claim 1 wherein said downlink pattern parameters are measured by at least one mobile receiver.

8. The method of claim 7 wherein said parameters are forwarded to said base station.

9. The method of claim 1 wherein said uplink pattern parameters are measured by said base station.

10. The method of claim 1 wherein said tilt angles are determined by said base station.

11. In a cellular telecommunications network with at least one base station antenna transmitting a downlink and receiving an uplink, a method for increasing a gain in a downlink carrier-to-interference ratio comprising the steps of:

measuring a downlink parameter associated with at least one of a downlink interference and a downlink coverage in a target cell, wherein said transmitted downlink is a signal received by at least one mobile unit;

applying a first downtilt angle to an antenna pattern associated with said downlink based on the measured downlink parameter; and applying a second downtilt angle to an antenna pattern associated with said uplink, wherein said received uplink is a signal transmitted by said at least one mobile unit, said first downtilt angle being different than said second downtilt angle.

12. The method of claim 11 wherein said cellular telecommunications network has two base station antennas, a first of said antennas transmitting a downlink and a second of said antennas receiving an uplink.

13. The method of claim 12 wherein at least one of said base stations further comprises a mechanical means for tilting at least one of said antennas.

14. The method of claim 13 wherein said mechanical means includes a physical mounting arrangement.

15. The method of claim 12 wherein said downtilt angles are measured, in degrees, from the vertical plane to the antenna axis.

16. The method of claim 15 wherein said downtilt angle of the downlink is higher than said downtilt angle of the uplink.

17. The method of claim 11 wherein said base station further comprises an electrical means for tilting at least one of said antennas.

18. The method of claim 17 wherein said electrical means includes a plurality of radiating elements corresponding to a linear array antenna, said elements having a phase excitation resulting in a tilt in a main beam of said antenna.

19. The method of claim 18 wherein a duplex filter is connected to each of said radiating elements, said filter separating a plurality of signals in a transmit distribution network and a receive combination network.

20. The method of claim 19 wherein said networks are designed for different downtilt angles and said linear array antenna has a transmission signal port and a reception signal port.

21. The method of claim 20 further comprises a second duplex filter for combining said ports into a common port.

22. The method of claim 19 wherein said transmit distribution network is connected to said duplex filter via an amplifier module having an electrically controlled phase shifter.

23. The method of claim 19 wherein said receive combination network is connected to a low noise amplifier.

24. The method of claim 11 wherein said downtilt angles are measured from the vertical plane to the antenna axis.

25. The method of claim 24 wherein said downtilt angle of the downlink is higher than said downtilt angle of the uplink.

26. An apparatus for increasing a gain in a downlink carrier-to-interference ratio in a cellular telecommunications network, with at least one base station antenna transmitting a downlink and receiving an uplink, comprising:

a means for applying a first downtilt angle to an antenna pattern associated with said downlink, wherein said transmitted downlink is received by at least one mobile unit; and a means for applying a second downtilt angle to an antenna pattern associated with said uplink, wherein said received uplink is transmitted by said at least one mobile unit, said first downtilt angle being different than said second downtilt angle.

27. The apparatus of claim 26 wherein said cellular telecommunications network has two base station antennas, a first of said antennas transmitting a downlink and a second of said antennas receiving an uplink.

28. The apparatus of claim 27 wherein said downtilt angles are measured, in degrees, from the vertical plane to the antenna axis.

29. The apparatus of claim 28 wherein said downtilt angle of the downlink is higher than said downtilt angle of the uplink.

30. The apparatus of claim 26 wherein said base station further comprises a mechanical means for tilting at least one of said antennas.

31. The apparatus of claim 30 wherein said mechanical means comprises a specific mounting arrangement.

32. The apparatus of claim 26 wherein said base station further comprises an electrical means for tilting at least of one of said antennas.

33. The apparatus of claim 32 wherein said electrical means comprises a plurality of radiating elements corresponding to a linear array antenna, said elements having a phase excitation resulting in a tilt in a main beam of said antenna.

34. The apparatus of claim 33 wherein a duplex filter is connected to each of said radiating elements, said filter separating a plurality of signals in a transmit distribution network and a receive combination network.

35. The apparatus of claim 34 wherein said networks are designed for different downtilt angles and said linear array antenna has a transmission signal port and a reception signal port.

36. The apparatus of claim 35 further comprises a second duplex filter for combining said ports into a common port.

37. The apparatus of claim 34 wherein said transmit distribution network is connected to said duplex filter via an amplifier module having an electrically controlled phase shifter.

38. The apparatus of claim 34 wherein said receive combination network is connected to a low noise amplifier.

39. The apparatus of claim 26 wherein said downtilt angles are measured, in degrees, from the vertical plane to the antenna axis.

40. The apparatus of claim 39 wherein said downtilt angle of the downlink is higher than said downtilt angle of the uplink.

* * * * *